(12) United States Patent
Andre et al.

(10) Patent No.: US 7,900,156 B2
(45) Date of Patent: Mar. 1, 2011

(54) ACTIVATING VIRTUAL KEYS OF A TOUCH-SCREEN VIRTUAL KEYBOARD

(75) Inventors: Bartley K. Andre, Menlo Park, CA (US); Bas Ording, San Francisco, CA (US); Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 741 days.

(21) Appl. No.: 11/696,703

(22) Filed: Apr. 4, 2007

(65) Prior Publication Data

US 2007/0247442 A1    Oct. 25, 2007

Related U.S. Application Data

(63) Continuation of application No. 11/228,737, filed on Sep. 16, 2005, which is a continuation-in-part of application No. 10/903,964, filed on Jul. 30, 2004.

(51) Int. Cl.
*G06F 3/048* (2006.01)
(52) U.S. Cl. .......................... 715/773; 715/863
(58) Field of Classification Search .................. 715/702, 715/773, 863, 771; 345/173
See application file for complete search history.

(56) References Cited

U.S. PATENT DOCUMENTS

| | | | | |
|---|---|---|---|---|
| 5,627,567 A | * | 5/1997 | Davidson | 345/173 |
| 5,740,390 A | | 4/1998 | Pickover et al. | 395/348 |
| 5,748,512 A | | 5/1998 | Vargas | 364/709.12 |
| 5,757,358 A | | 5/1998 | Osga | 345/146 |
| 5,805,165 A | | 9/1998 | Thorne, III et al. | 345/348 |
| 5,825,352 A | | 10/1998 | Bisset et al. | 345/173 |
| 5,877,751 A | | 3/1999 | Kanemitsu et al. | 345/173 |
| 5,963,671 A | | 10/1999 | Comerford et al. | 382/230 |

(Continued)

FOREIGN PATENT DOCUMENTS

EP    1 271 295 A2    1/2003

(Continued)

OTHER PUBLICATIONS

Office Action dated Sep. 8, 2009 received in Australian Patent Application No. 2006291338, which corresponds to U.S. Appl. No. 11/228,737.

(Continued)

*Primary Examiner* — Kieu Vu
*Assistant Examiner* — Omar Abdul-Ali
(74) *Attorney, Agent, or Firm* — Morgan, Lewis & Bockius LLP

(57) ABSTRACT

A method of operating a touch screen to activate one of a plurality of virtual keys is provided. A touch location is determined based on location data pertaining to touch input on the touch screen, wherein the touch input is intended to activate one of the plurality of virtual keys. Each of the plurality of virtual keys has a set of at least one key location corresponding to it. For each of the virtual keys, a parameter (such as physical distance) is determined for that virtual key that relates the touch location and the set of at least one key location corresponding to that virtual key. The determined parameters are processed to determine one of the virtual keys. For example, the determined one virtual key may be the virtual key with a key location (or more than one key location, on average) being closest to the touch location. A signal is generated indicating activation of the determined one of the virtual keys.

19 Claims, 6 Drawing Sheets

U.S. PATENT DOCUMENTS

| | | | | |
|---|---|---|---|---|
| 6,049,326 | A | 4/2000 | Beyda et al. | 345/157 |
| 6,104,384 | A | 8/2000 | Moon et al. | 345/168 |
| 6,259,436 | B1 * | 7/2001 | Moon et al. | 345/173 |
| 6,278,443 | B1 | 8/2001 | Amro et al. | 345/173 |
| 6,411,283 | B1 | 6/2002 | Murphy | 345/173 |
| 6,567,109 | B1 | 5/2003 | Todd | 345/862 |
| 6,643,824 | B1 | 11/2003 | Bates et al. | 715/501.1 |
| 6,938,220 | B1 | 8/2005 | Shigematsu et al. | 715/863 |
| 7,277,088 | B2 * | 10/2007 | Robinson et al. | 345/173 |
| 7,352,365 | B2 | 4/2008 | Trachte | 345/173 |
| 7,489,306 | B2 | 2/2009 | Kolmykov-Zotov et al. | 345/173 |
| 7,605,804 | B2 | 10/2009 | Wilson | 345/173 |
| 2002/0051018 | A1 | 5/2002 | Yeh | 345/784 |
| 2003/0063073 | A1 | 4/2003 | Geaghan et al. | 345/173 |
| 2004/0136564 | A1 | 7/2004 | Roeber et al. | 382/100 |
| 2004/0155869 | A1 | 8/2004 | Robinson et al. | 345/168 |
| 2004/0183833 | A1 * | 9/2004 | Chua | 345/773 |
| 2005/0116927 | A1 * | 6/2005 | Voelckers | 345/157 |
| 2005/0190970 | A1 | 9/2005 | Griffen | 382/209 |
| 2006/0007174 | A1 | 1/2006 | Shen | 345/173 |
| 2006/0161871 | A1 | 7/2006 | Hotelling et al. | 715/863 |
| 2007/0260987 | A1 * | 11/2007 | Mohoney et al. | 715/723 |
| 2009/0284471 | A1 | 11/2009 | Longe et al. | 345/168 |

FOREIGN PATENT DOCUMENTS

| | | |
|---|---|---|
| EP | 1 569 079 A1 | 8/2005 |
| EP | 1 674 976 A2 | 6/2006 |
| GB | 2 351 639 A | 1/2001 |
| WO | WO 00/38042 A1 | 6/2000 |

OTHER PUBLICATIONS

Office Action dated Oct. 19, 2009, received in U.S. Appl. No. 11/228,737.

Centroid, http://faculty,evansville.edu/ck6/tcenters/class/centroid.html, printed Apr. 28, 2006, 4 pages.

International Search Report and Written Opinion for International Application No. PCT/US2008/050426, mailed Jun. 13, 2008.

International Search Report and Written Opinion for International Application No. PCT/US2007/077645, mailed Jan. 10, 2008.

Office Action dated Mar. 19, 2009, for related U.S. Appl. No. 11/228,737.

Office Action dated Oct. 14, 2008, received in the European Patent Application which corresponds to U.S. Appl. No. 11/228,737.

Office Action dated Dec. 7, 2009, received in European Patent Application No. 08 727 399.1, which corresponds to U.S. Appl. No. 11/969,796.

Office Action dated Jun. 7, 2010, received in U.S. Appl. No. 11/850,015.

Office Action dated Feb. 18, 2010, received in Australian Patent Application No. 2007292384, which corresponds to U.S. Appl. No. 11/850,015.

Office Action dated Feb. 16, 2010, received in European Patent Application No. 07 814 691.7, which corresponds to U.S. Appl. No. 11/850,015.

Office Action dated Feb. 23, 2010, received in U.S. Appl. No. 11/228,737.

Office Action dated Jun. 10, 2010, received in Chinese Application for Invention No. 200780040508.2, which corresponds to U.S. Appl. No. 11/850,015, 4 pages.

Office Action dated Jun. 7, 2010, received in German Patent Application No. 11 2007 002 088.1-53, which corresponds to U.S. Appl. No. 11/850,015, 8 pages.

Notice of Allowance dated Sep. 7, 2010, received in U.S. Appl. No. 11/228,737.

Notice of Allowance dated Sep. 27, 2010, received in U.S. Appl. No. 11/850,015.

Office Action dated Oct. 5, 2010, received in Australian Patent Application No. 2006291338, which corresponds to U.S. Appl. No. 11/228,737.

* cited by examiner $d_q$ is Shortest

ACTIVATING VIRTUAL KEYS OF A TOUCH-SCREEN VIRTUAL KEYBOARD

CROSS-REFERENCE TO RELATED APPLICATIONS

This application is a continuation of application Ser. No. 11/228,737 filed Sep. 16, 2005 from which priority under 35 U.S.C. §120 is claimed, which is hereby incorporated by reference in its entirety, which application is a Continuation-In-Part of prior application Ser. No. 10/903,964 filed Jul. 30, 2004, from which priority under 35 U.S.C. §120 is claimed, which is hereby incorporated by reference in its entirety. This application is also related to the following co-pending applications: U.S. Ser. No. 10/840,862, Filed May 6, 2004; U.S. Ser. No. 11/048,264, Filed Jul. 30, 2004; U.S. Ser. No. 11/038,590, filed Jul. 30, 2004; (U.S. Ser. No. 11/228,758), entitled "VIRTUAL INPUT DEVICE PLACEMENT ON A TOUCH SCREEN USER INTERFACE", filed concurrently herewith; and (U.S. Ser. No. 11/228,700), entitled "OPERATION OF A COMPUTER WITH TOUCH SCREEN INTERFACE", filed concurrently herewith; all of which are hereby incorporated herein by reference in their entirety for all purposes.

TECHNICAL FIELD

The present invention is in the field of touch screens and, in particular, relates to operating a touch screen to activate one of a plurality of virtual keys.

BACKGROUND

A touch screen is a type of display screen that has a touch-sensitive transparent panel covering the screen. When using a touch screen, a user makes a selection on the display screen by pointing directly to GUI objects on the screen (usually with a stylus or finger). The GUI objects may be considered as virtual keys (for example, of a keyboard). It is desirable to increase the usability of display screens for activating virtual keys.

SUMMARY

In accordance with one aspect, a method of operating a touch screen to activate one of a plurality of virtual graphical user interface (GUI) items is provided. A touch location is determined based on location data pertaining to touch input on the touch screen, wherein the touch input is intended to activate one of the plurality of virtual GUI items. Each of the plurality of virtual GUI items has a set of at least one item location corresponding to it. For each of the virtual GUI items, a parameter (such as physical distance) is determined for that virtual GUI item that relates the touch location and the set of at least one item location corresponding to that virtual GUI item. The determined parameters are processed to determine one of the virtual GUI items. For example, the determined one virtual GUI item may be the virtual GUI item with an item location (or more than one item location, on average) being closest to the touch location. A signal is generated indicating activation of the determined one of the virtual GUI items.

In accordance with another aspect, a method of operating a touch screen to activate one of a plurality of virtual keys is provided. Thus, for example, the virtual keys may be considered specific examples of virtual GUI items. A touch location is determined based on location data pertaining to touch input on the touch screen, wherein the touch input is intended to activate one of the plurality of virtual keys. Each of the plurality of virtual keys has a set of at least one key location corresponding to it. For each of the virtual keys, a parameter (such as physical distance) is determined for that virtual key that relates the touch location and the set of at least one key location corresponding to that virtual key. The determined parameters are processed to determine one of the virtual keys. For example, the determined one virtual key may be the virtual key with a key location (or more than one key location, on average) being closest to the touch location. A signal is generated indicating activation of the determined one of the virtual keys.

Weights may be associated with each key location, and the weights may be adjusted dynamically based on a sequence of virtual keys previously activated and, in some examples, also based on external considerations such as statistical probabilities of particular virtual keys being activated (based, for example, on dictionaries or letter occurrence frequency data).

In one example, a dictionary lookup is used, and all of the letters of a word are considered in doing the dictionary lookup. In other examples, an "x" (e.g., 4) letter rolling window is considered. Thus, for a word that is (or is, thus far) less than or equal to "x" letters, the entire word is used in the dictionary lookup. Once the "x" letter window is full, only the "x" letters are considered. This can reduce the amount of processing relative to considering greater than "x" letters. In addition, a hybrid approach may be used. For example, a dictionary lookup may be used (perhaps with a relatively small dictionary) initially and, if the word is not in the dictionary, then the letters of the rolling window is considered. In some examples, the positioning of the letters in the words (particularly, but not limited to, at the beginning of a word) is considered. In one example, this is accomplished by considering "space" as the first letter of a word. Furthermore, in some examples, the frequency of occurrence of a word (e.g., within a particular document) may be used as input for adjusting the weights.

Thus, the usability of touch screen virtual keyboards is enhanced.

BRIEF DESCRIPTION OF FIGURES

FIG. 1 illustrates a keyboard GUI (having multiple keys) displayed on a touch screen, where each dot (not displayed on the touch screen) indicates a key location corresponding to a separate virtual key (which typically are not, but may be, coincident with the each displayed key of the keyboard GUI).

DETAILED DESCRIPTION

We now describe a method of operating a touch screen to activate one of a plurality of virtual keys. The touch screen is an input device of a computing system which, for example, operates under program control (where the program is stored as instructions in a memory, for example) based at least in part on user input. The computing system may be, for example, a personal computer, a computing system embedded within an electronic device (such as, for example, a cellular telephone, media player or other consumer electronic device.) In operation, a user interacts with the touch screen and, in response, the touch screen (and or hardware/software associated with the touch screen) provides location data pertaining to touch input on the touch screen.

Figures 1, 1A:
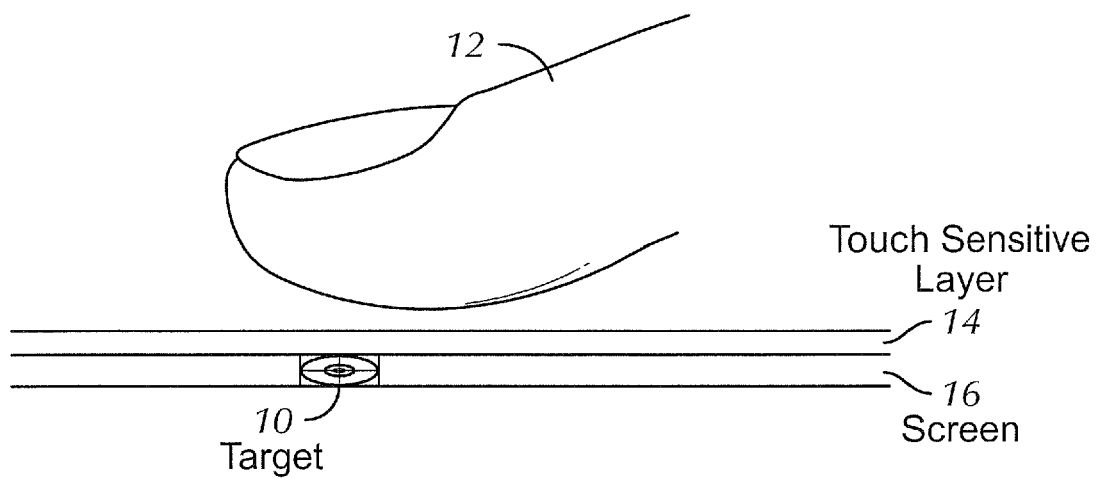
FIGS. 1-1A through 1-1C illustrate a typical mismatch between the touch area of a user's finger, to activate a GUI item on a touch screen, and a visual target associated with that GUI item.
Figures 1, 1B:
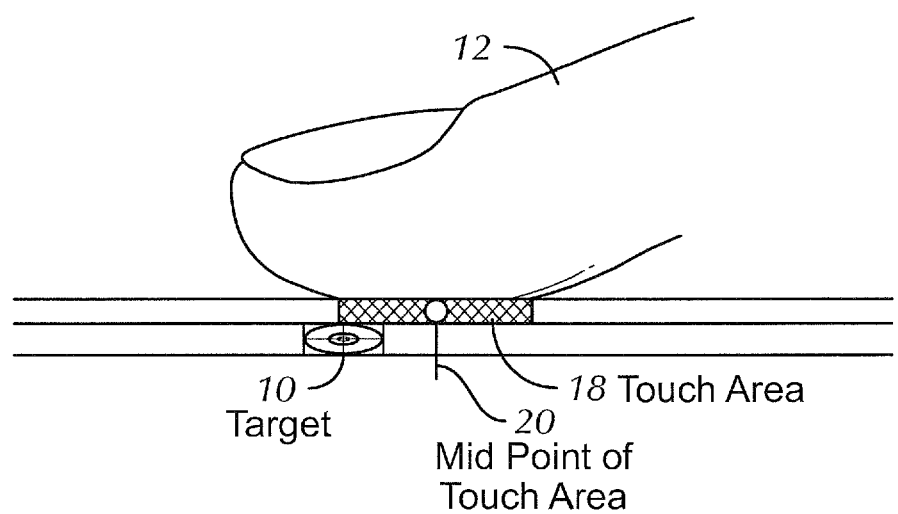
Figures 1, 1C:
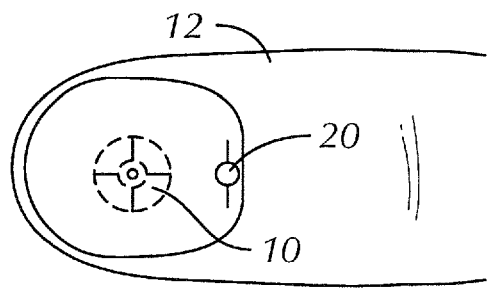
Figure 1:
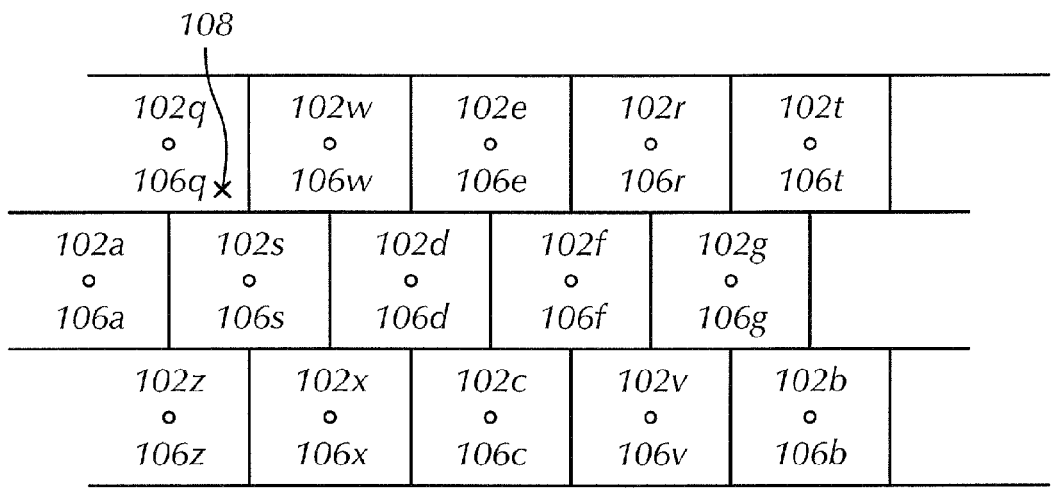
Figure 9:
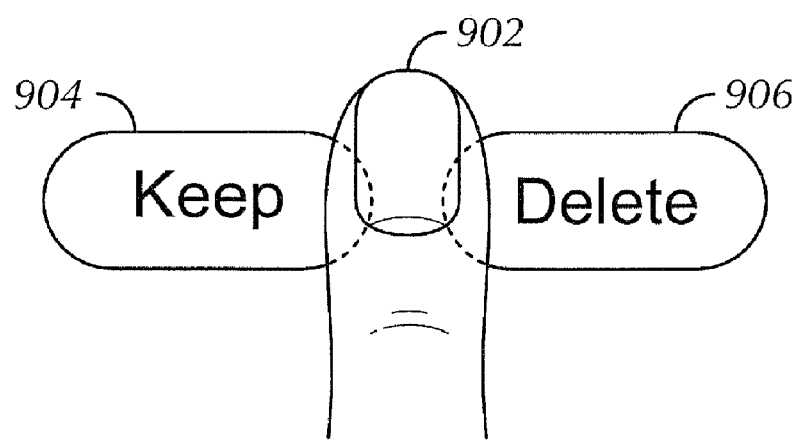
FIG. 9 illustrates an example of virtual GUI items on a touch screen display where, in this example, the virtual GUI items are not virtual keys of a keyboard.

The touch screen provides a graphical user interface that includes GUI items that can be activated by the user as input to the program operating on the computer system. As can be seen from FIG. 1-1A, 1-1B and 1-1C, the touch area of a user's finger, to activate a GUI item on a touch screen, typically does not match a visual target associated with that GUI item. FIG. 1-1A shows a finger 12 approaching the touch-sensitive layer 14 of the touch screen. FIG. 1-1A also shows a visual target 10 displayed on the screen 16 of the touch screen. FIG. 1-1B shows the finger 12 touching the touch sensitive layer 14. It can be seen from FIG. 1-1B that the finger 12 contacts the touch sensitive layer 14 at a touch area 18. The mid-point 20 of the touch area 18 does not match the visual target 10 displayed on the screen 16 of the touch screen. FIG. 1-1C shows a plan view of the finger 12, visual target 10 and mid-point 20 of the touch area 18. FIG. 9 illustrates, in plan view, a situation where a finger 902 is being used to potentially activate two somewhat small GUI items, a keep GUI item 904 and a delete GUI item 906.

It is desirable to process touches on a touch screen in a way that does not necessarily depend on a match between the visual target 10 and a touch area of a touch to activate a GUI to which the visual target 10 corresponds. It is desirable to process touches on a touch screen in a way that "makes sense," which may include considering factors beyond (or instead of) a correspondence of the visual target and the touch area of a touch to activate the GUI to which the visual target corresponds.

In one example, the GUI items are virtual keys of a virtual keyboard. The GUI items are not limited to being virtual keys of a virtual keyboard, however. FIG. 1 illustrates a portion of a touch screen, where the gridlines 104 are displayed to the user, visually defining "keys" that are present on a conventional qwerty keyboard. The shapes and locations of the visually-defined keys need not be operationally correlated to the shapes of the virtual keys. This will be seen later, particularly with reference to FIG. 7. The visually-defined keys are labeled in FIG. 1 as 102$q$, 102$w$, 102$e$, etc., to indicate the letter to which each key corresponds on a conventional qwerty keyboard.

Each of the plurality of virtual keys has a set of at least one key location corresponding to it. The dots 106$q$, 106$w$, 106$e$, etc indicate key locations. In the FIG. 1 example, each set of key locations (corresponding to a separate virtual key) is a set of one key location. Later, sets of key locations are illustrated that include more than one key location.

In FIG. 1, a touch location is denoted by the "X" 108. In accordance with a broad aspect, a parameter is determined for each virtual key that relates the touch location to the set of at least one key location corresponding to that virtual key. The determined parameters are processed to determine one of the virtual keys, and a signal is generated indicating activation of the determined one of the virtual keys.

Figure 2:
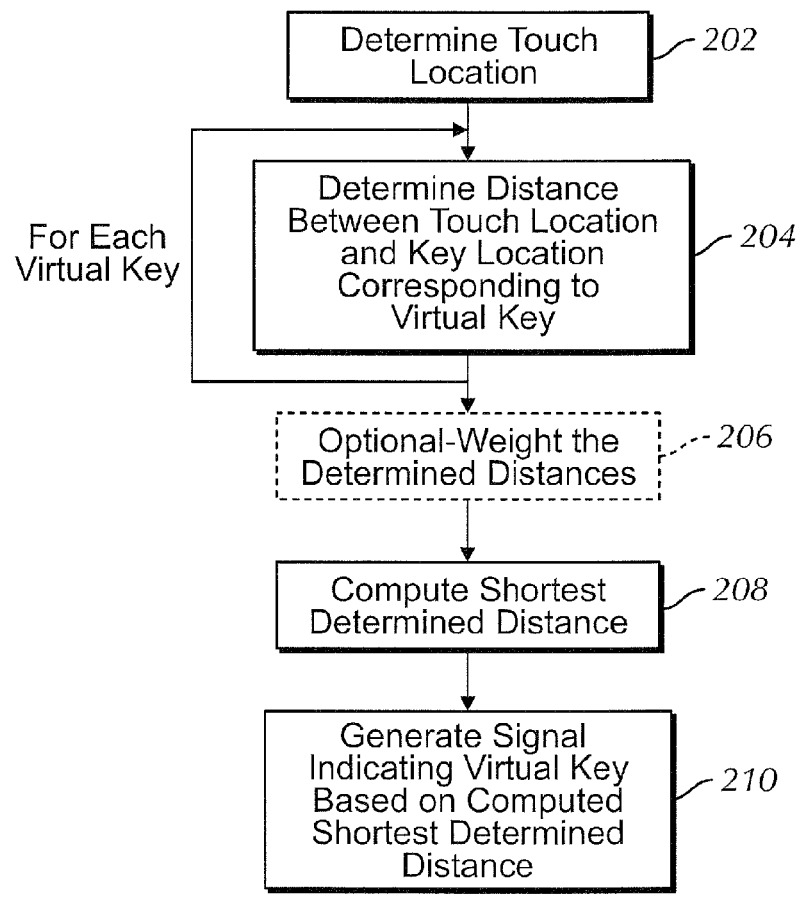
FIG. 2 is a flowchart illustrating one example method to determine which virtual key a user has activated.

We now reference FIG. 2, which is a flowchart illustrating a particular example of a virtual key activation method. For simplicity of illustration, we initially describe a situation like in FIG. 1 where each set of key locations is a set of one key location. At step 202, the touch location is determined, based on location data pertaining to touch input on the touch screen. The location data may be provided, for example, by low level program code being executed by a processor associated with the touch screen. Referring to the FIG. 1 example, the touch location is denoted by the "X" 108.

At step 204, for each virtual key, a distance is determined between the touch location "X" 108 and the key location 106 (generically) corresponding to that virtual key. Step 206 is a step included in some examples, and step 206 is discussed later. At step 208, it is determined to which of the virtual keys the shortest distance determined in step 204 corresponds. At step 210, a signal is generated to indicate activation of the virtual key determined in step 208.

Figure 3:
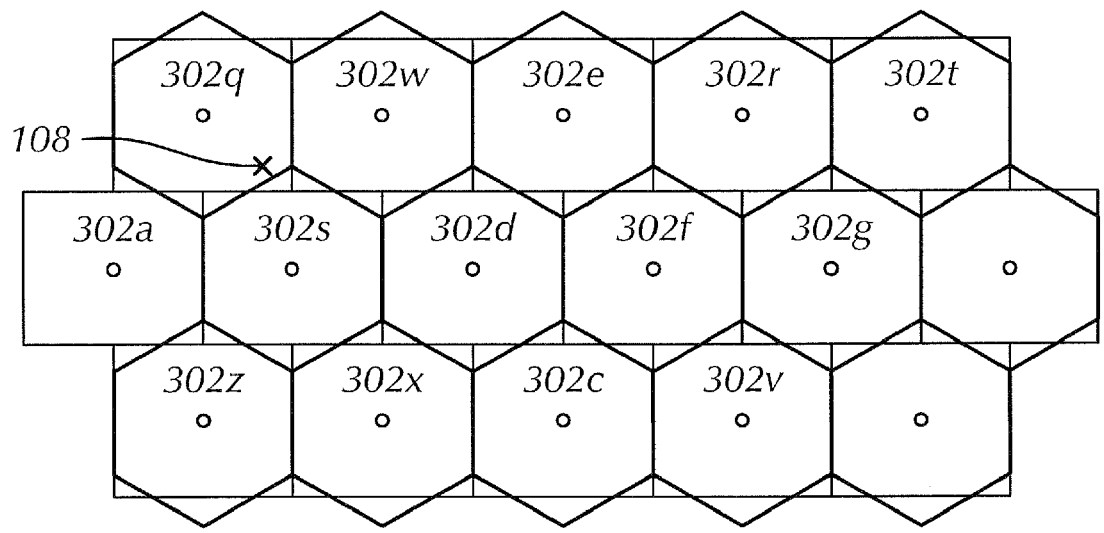
FIG. 3 illustrates the shapes (typically not displayed on the touch screen) of the virtual keys corresponding to the displayed keys of the FIG. 1 keyboard GUI, as well as illustrating the dots that indicate the key locations.
Figures 1, 3:
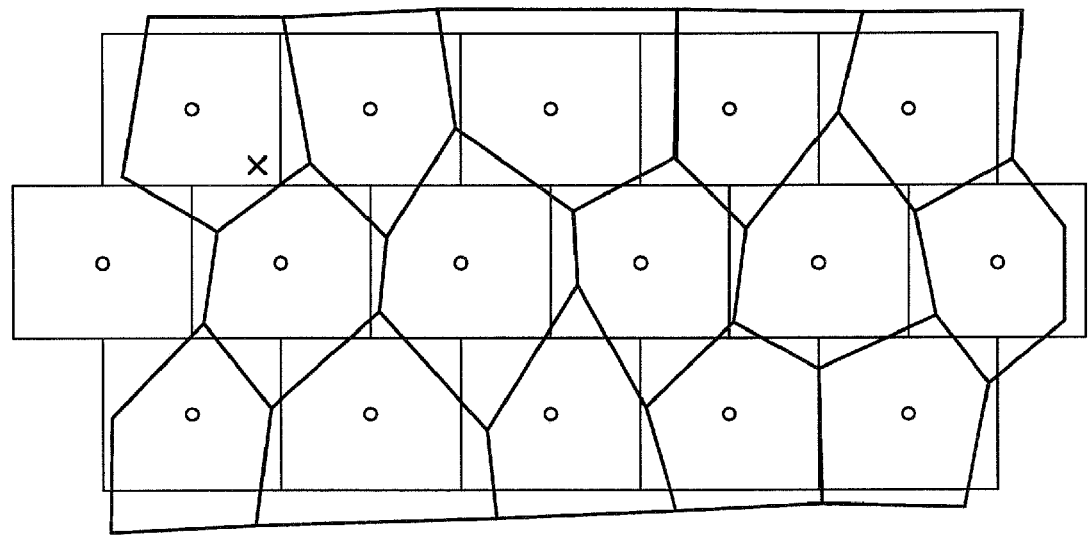

Having described a particular example of a virtual key activation method, we now refer to the illustration in FIG. 3. The hexagonal shapes 302$q$, 302$w$, 302$e$, etc. illustrate an example of the shapes of the virtual keys, superimposed on the visually-defined keys 102. The example touch location "X" 108 shown in FIG. 1 is also shown in FIG. 3. Typically, the hexagonal (or other) shapes of the virtual keys would not be displayed to the user. Generically, the particular configuration of each virtual key 302 is based on the number and configuration of the key locations in the set of key locations corresponding to the virtual key. Other example configurations will be described later.

FIG. 3-1 illustrates an example in which, in contrast to FIG. 3, there is not such a regular correspondence between the visual targets and the key locations.

Figure 4:
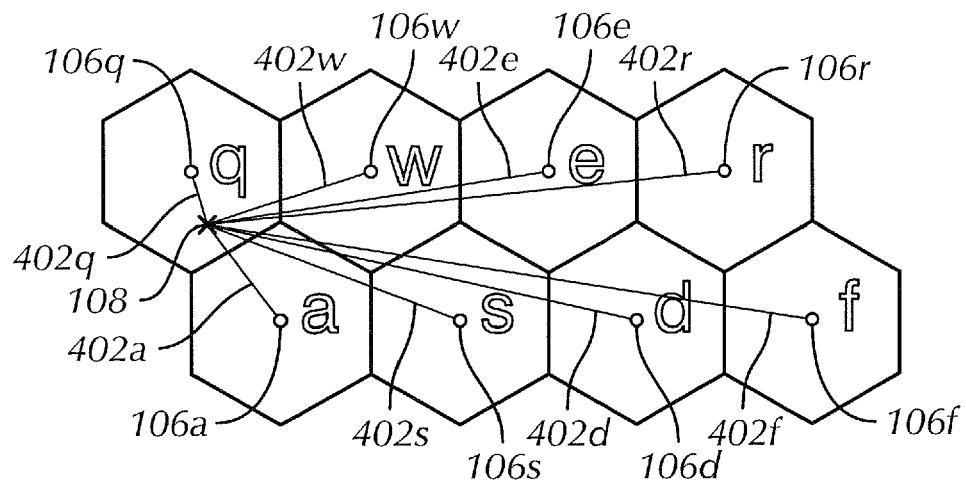
FIG. 4 is a schematic diagram useful to explain the FIG. 2 flowchart.

FIG. 4 illustrates an example of the distance determination step 204 of FIG. 2. Specifically, the length of each line segment 402$q$, 402$w$, 402$e$, etc. represents the distance between the touch location "X" 108 and each respective key locations 106$q$, 106$w$, 106$e$, etc. It can be seen that the line segment 402 having the shortest such length is 402$q$, which would be the result of step 208 as applied to the example of FIG. 1 and FIG. 3.

With FIG. 3 in particular as background, we discuss step 206 of the FIG. 2 flowchart. At step 206 (shown as a dashed rectangle), the distances determined at step 204 may be weighted by a weighting factor. For example, each distance may be multiplied by a weighting factor. The weighting factor for each virtual key affects the size of that virtual key. The smaller the weighting factor associated with a first virtual key relative to the weighting factor associated with a second virtual key, the smaller the first virtual key is relative to the second virtual key (that is, the closer a touch location must be to a key location, relatively, to cause activation of the virtual key to which the key location corresponds.) In some examples, the weighting factors are normalized such that a weighting factor of one has no effect on the size of a virtual key, while a weighting factor greater than one has the effect of enlarging a virtual key, while a weighting factor less than one has the effect of diminishing the virtual key. The application of the weighting factors need not be linear. For example, the square root of the distance may be multiplied by the weighting factor.

Figure 5:
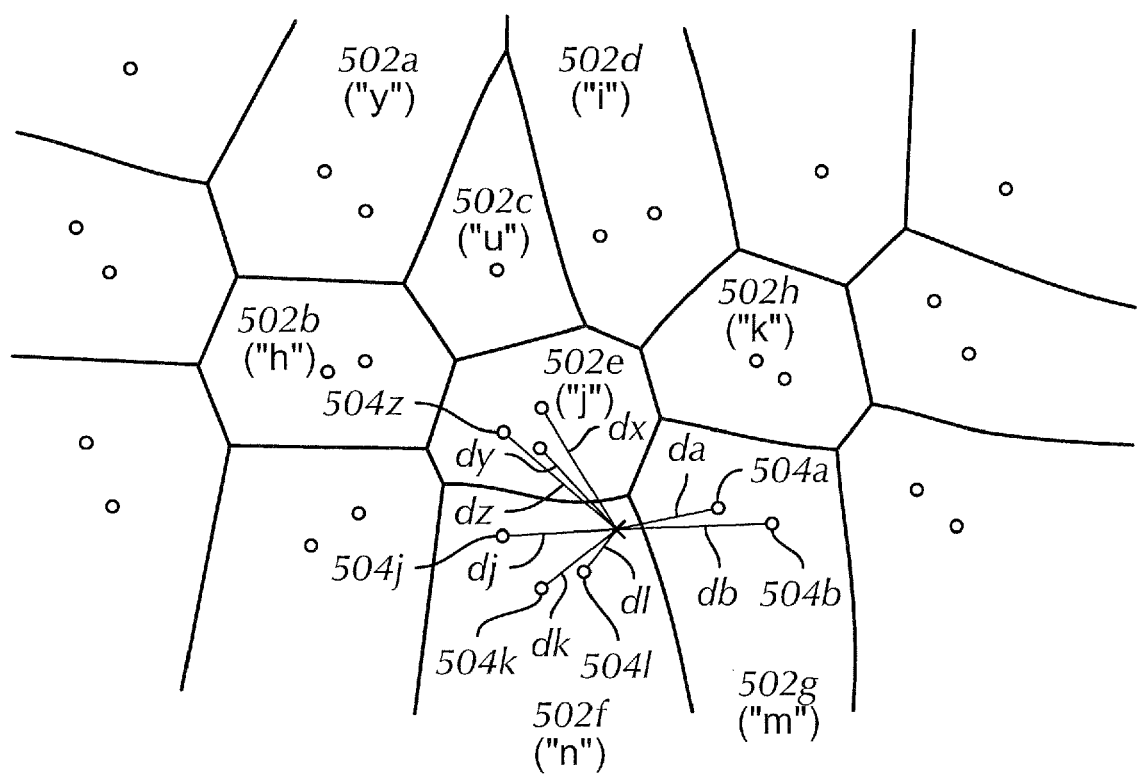
FIG. 5 illustrates an example layout of virtual keys on a touch screen where each of at least one of the virtual keys has a set of greater than one key location corresponding to that virtual key.

We now turn to FIG. 5, which illustrates an example layout of virtual keys on a touch screen where each of at least one of the virtual keys has a set of greater than one key location corresponding to that virtual key. For example, referring to FIG. 5, a plurality of virtual keys (for example, designated by reference numerals 502a through 502h are illustrated. The boundary of each virtual key (502, generally) is a function of the position (and, if applicable, weighting) of the plural key locations corresponding to that virtual key. It is noted that the keyboard graphic actually viewable by the user may not directly coincide with the irregularly-shaped boundaries of the virtual keys 502.

Figure 6:
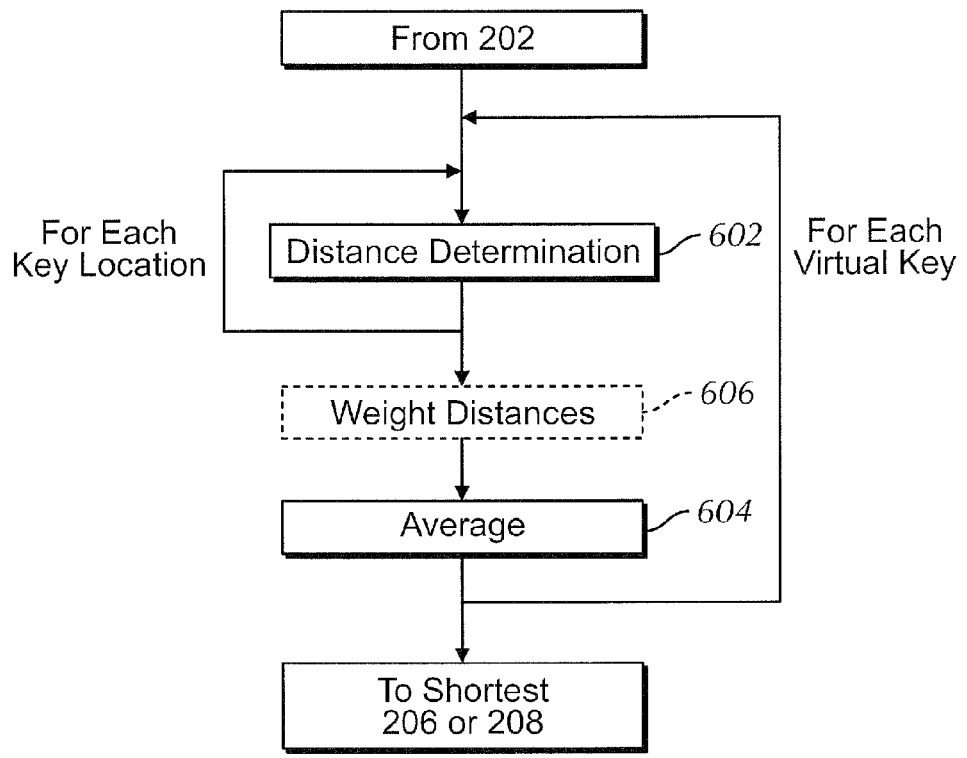
FIG. 6 is a flowchart illustrating a portion of the FIG. 2 flowchart for a virtual key such as is shown in FIG. 5, having more than one key location corresponding to it.

FIG. 6 illustrates steps 602 and 604, which may be included in step 204 of FIG. 2. In particular, step 602 determines, for each key location in the set of at least one key location corresponding to a virtual key, the distance between the touch location and the key location. With regard to the specific example of the virtual "m" key in FIG. 5, step 602 includes determining the distances da and db. The distance provided to step 206 or step 208 (FIG. 2) for the virtual "m" key is then determined, at step 604, as the average of da and db. In some examples, a step 606 (which, like step 206 in FIG. 2, is shown as a dashed rectangle) is included in which the distances determined in step 602 (e.g., da, db and dc) may be weighted before an average is determined at step 604. Some reasons that it may be desired to weight particular key locations corresponding to a virtual key are discussed later.

Referring still to FIG. 6, steps 602 and 604 (and, sometimes, step 606) are also performed for virtual "j" and "n" keys (and the other virtual keys). For the virtual "j" key, distances dx, dy and dz are determined. For the virtual "n" key, distances dj, dk and dk are determined. In some examples, some optimizations are realized such that the distances are not determined for every virtual key and/or for every key location associated with a particular virtual key.

Referring back to FIG. 2, optional step 206 and step 208 are carried out using the distances determined in the step 604 processing for the each virtual keys. As a result, the activated virtual key is the one virtual key for which there is the shortest physical distance between the key locations, associated with that virtual key, and the touch location.

We now discuss how the key locations are determined, in some examples. While in some examples, the key locations may be predetermined, in other examples, the key locations are dynamically determined. For example, a keyboard interface may be initially activated on a touch screen by processing that detects simultaneous touching of the touch screen by a plurality of fingers, where the particular number may vary by example. In one example, the keyboard interface is only activated if the relative positions of the touching fingers on the touch screen are consistent (within some threshold) with the positions of fingers on an actual keyboard. Once the initial positions of some of the keys (more properly, the initial key locations associated with virtual keys) are determined based on the respective positions of the touching fingers, initial key locations for remaining virtual keys of the keyboard, even though not directly corresponding to touch locations, may be determined. For example, the key locations for the remaining virtual keys of the keyboard may be set to have a predetermined relationship to the key locations for the virtual keys whose key locations are determined directly from the touch locations.

Figure 7:
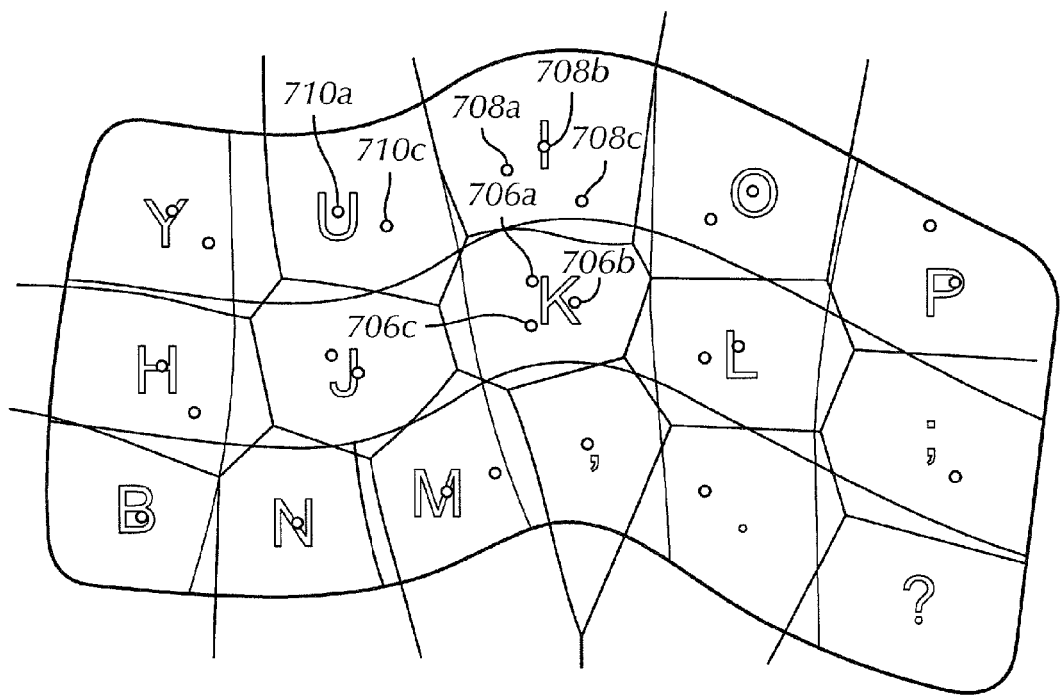
FIG. 7 illustrates an example layout of key locations corresponding to virtual keys on a touch screen based on an initial "touch" by a user of fingers simultaneously in a "home key" position on the touch screen.

FIG. 7 illustrates a portion of a virtual keyboard. The lines 702 indicate the boundaries of the virtual keys, whereas the lines 704 indicate the key boundaries as displayed to the user on the touch screen. The "dots" (for example, 706a, 706b and 706c; 708a, 708b and 708c; and 710a and 710b) are not typically displayed but, rather, indicate key locations for the virtual keys.

In some examples, rather than strictly considering distance between a touch location and key locations, statistical parameters of the distribution of the key locations is taken into account. Thus, for example, a touch location that is "closer" in standard deviation terms to the distribution of key locations for a first virtual key than to the distribution of key locations for a second virtual key is considered to correspond to an activation of the first virtual key. Thus, in one example, a first virtual key has corresponding to it a relatively closely-spaced distribution of key locations, relative to the distribution of key locations corresponding to a second virtual key. With these example distributions of key locations, in order for a touch location to correspond to activation of the a touch location would have to be relatively closer (in physical distance) to the center of the relatively closely-spaced distribution of key locations corresponding to the first virtual key than to the center of the distribution of relatively further-spaced key locations corresponding to the second virtual key.

We now discuss how, in one example, how particular virtual keys come to have multiple key locations associated with them. In particular, when it is determined which virtual key a touch location has activated, that touch location may be considered as an additional key location for the activated virtual key. In some examples, the key locations for the virtual keys are accumulated, although the number of key locations for each virtual key may be limited such that, for example, the key locations corresponding to the touch locations earliest in time may be discarded.

Furthermore, some key locations may be "backed out" based on conditions that occur later in time than when the key locations was first considered to be a key location. One such later-occurring condition is that a later touch condition is determined to correspond to a "backspace" virtual key that, when activated, would nullify the activation of the virtual key to which the to-be backed out key locations corresponds.

In addition, the weights associated with particular virtual keys (see step 202 in FIG. 2 and step 606 in FIG. 6) may be adjusted dynamically. In one example, the weights are adjusted based on the sequence of virtual keys already activated. For example, the weight associated with the most likely next virtual key to be activated, based on the sequence of virtual keys already activated, may be set to be higher (or lower) than the weights associated with other virtual keys. What virtual key is most like to be activated may be determined, for example, using a dictionary (word-based), statistical probability for individual letters (for example, based on statistical frequency of occurrence), or a combination of both. In some examples, virtual keys deemed to be "dangerous" (e.g., whose the result of whose activation may be difficult to reverse) are given a smaller weight. Potential examples of such "dangerous" keys may include, for example, a "delete" key or "cancel" key (for example, the "delete" GUI item 906 in FIG. 9.) Furthermore, in some examples, the slower virtual keys are activated (corresponding, nominally, to more deliberate activation), the less any particular virtual key would be weighted.

The described examples may be particularly useful where the virtual keyboards are small relative to the touch area with which a user may activate a virtual key. With a conventional keyboard (with which, for example, it is determined that a particular virtual key is activated by determining if the touch area is within a boundary corresponding to that virtual key), the touch area may correspond to more than one virtual key.

Figure 8:
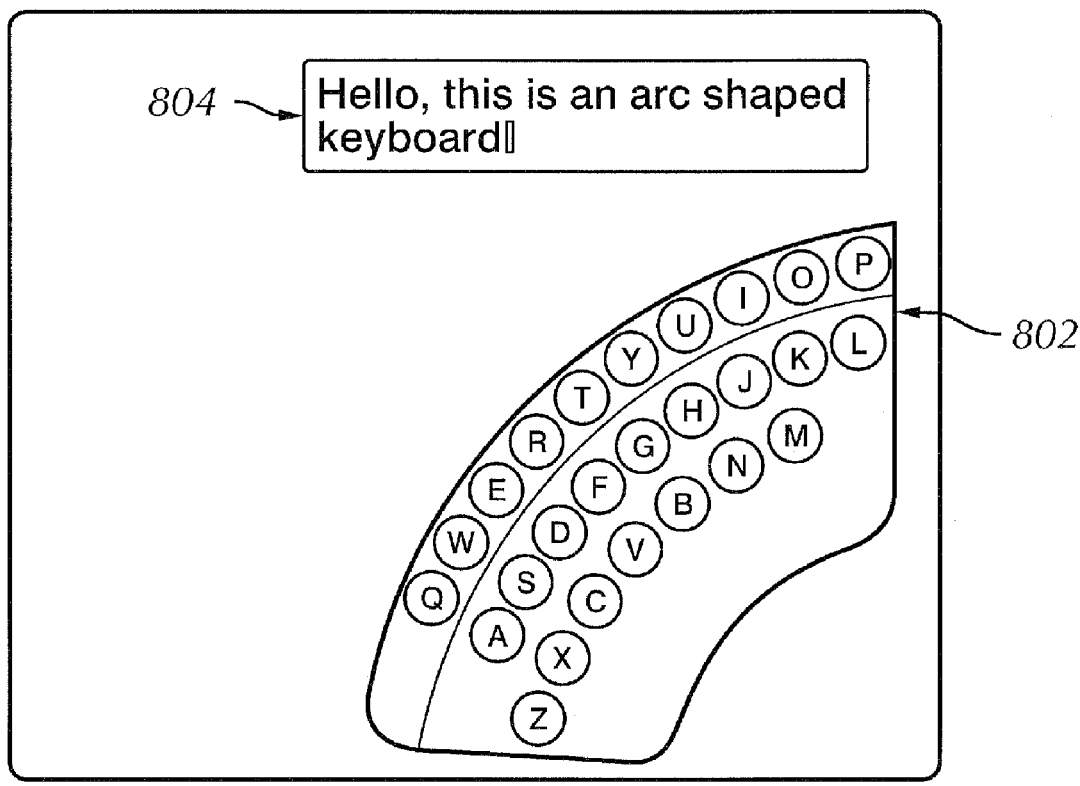
FIG. 8 illustrates an example arc-shaped keyboard, particularly suited for activation of the virtual keys using a thumb.

For example, FIG. 8 illustrates an example of an arc-shaped keyboard that may be particularly suited for thumb activation of the relatively small and close-together virtual keys. The visual display 802 associated with the FIG. 8 keyboard, as well as (nominally) the layout of the key locations used to determine which virtual key is activated) is arc-shaped. An output area 804 is also shown, which provides an indication of the activated virtual keys.

The thumb, for example, is relatively large and difficult to control. The arc-shaped keyboard may be initiated by a particular gesture such as "swiping" the thumb across a corner of the touch screen. The arc-shaped keyboard may be, for example, located in a corner of the touch screen easily reachable for activation of the virtual keys by a thumb of a hand holding the touch screen computer.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of processing input from a touch screen, the method comprising:
   displaying on the touch screen a plurality of GUI items, each item having a displayed extent and a corresponding set of one or more GUI item locations;
   processing a touch input point to activate a respective GUI item in the plurality of GUI items, wherein:
      the touch input point activating the respective GUI item need not be within the displayed extent of the respective GUI item; and
      the processing includes determining a distance from the touch input point to one or more GUI item locations corresponding to each of the plurality of GUI items; and
   adding a GUI item location to the set of one or more GUI item locations corresponding to the respective GUI item, the added GUI item location corresponding to the location of the touch input point, the added GUI item location configured for use in processing a subsequent touch input point.

2. The method of claim 1 wherein the touch input point activating the respective GUI item is within the displayed extent of another GUI item.

3. The method of claim 1 wherein processing the touch input point to activate the respective GUI item further comprises:
   generating a virtual key shape for each of the plurality of GUI items, wherein the virtual key shape does not exactly correspond to the displayed extent of the GUI item;
   detecting a touch input point within the virtual key shape for the respective GUI item; and
   activating the respective GUI item.

4. The method of claim 1 wherein processing the touch input point to activate the respective GUI item further comprises:
   applying a weighting to each of the determined distances; and
   activating the respective GUI item having one or more GUI item locations that are a shortest weighted distance from the touch input point.

5. The method of claim 4 wherein the weightings for each determined distance are all equal.

6. The method of claim 4 wherein the weightings are determined dynamically.

7. The method of claim 1, wherein the adding includes limiting a number of one or more GUI item locations corresponding to each GUI item of the plurality of GUI items.

8. The method of claim 1, wherein the adding includes removing a GUI item location that was added earliest among the one or more GUI item locations in the set of one or more GUI item locations corresponding to the respective GUI item, from the set of one or more GUI item locations corresponding to the respective GUI item.

9. A computing device, comprising:
   a touch screen;
   a processor;
   memory; and
   a program that is stored in the memory and configured to be executed by the processor, the program including instructions for:
   displaying on the touch screen a plurality of GUI items, each item having a displayed extent and a corresponding set of one or more GUI item locations;
   processing a touch input point to activate a respective GUI item in the plurality of GUI items, wherein:
      the touch input point activating the respective GUI item need not be within the displayed extent of the respective GUI item; and
      the processing includes determining a distance from the touch input point to one or more GUI item locations corresponding to each of the plurality of GUI items; and
   adding a GUI item location to the set of one or more GUI item locations corresponding to the respective GUI item, the added GUI item location corresponding to the location of the touch input point, the added GUI item location configured for use in processing a subsequent touch input point.

10. The computing device of claim 9, wherein the touch input point activating the respective GUI item is within the displayed extent of another GUI item.

11. The computing device of claim 9, wherein processing the touch input point to activate the respective GUI item further comprises:
   applying a weighting to each of the determined distances; and
   activating the respective GUI item having one or more GUI item locations that are a shortest weighted distance from the touch input point.

12. The computing device of claim 11, wherein the weightings are determined dynamically.

13. The computing device of claim 9, wherein the adding includes limiting a number of one or more GUI item locations corresponding to each GUI item of the plurality of GUI items.

14. The computing device of claim 9, wherein the adding includes removing a GUI item location that was added earliest among the one or more GUI item locations in the set of one or more GUI item locations corresponding to the respective GUI item, from the set of one or more GUI item locations corresponding to the respective GUI item.

15. A computer readable storage medium storing a program, the program comprising instructions, which when executed by a computing device with a touch screen, cause the device to:

display on the touch screen a plurality of GUI items, each item having a displayed extent and a corresponding set of one or more GUI item locations;

process a touch input point to activate a respective GUI item in the plurality of GUI items, wherein:

the touch input point activating the respective GUI item need not be within the displayed extent of the respective GUI item; and the processing includes determining a distance from the touch input point to one or more GUI item locations corresponding to each of the plurality of GUI items; and add a GUI item location to the set of one or more GUI item locations corresponding to the respective GUI item, the added GUI item location corresponding to the location of the touch input point, the added GUI item location configured for use in processing a subsequent touch input point.

16. The computer readable storage medium of claim 15, wherein the touch input point activating the respective GUI item is within the displayed extent of another GUI item.

17. The computer readable storage medium of claim 15, wherein processing the touch input point to activate the respective GUI item further comprises:

applying a weighting to each of the determined distances; and activating the respective GUI item having one or more GUI item locations that are a shortest weighted distance from the touch input point.

18. The computer readable storage medium of claim 15, wherein the adding includes limiting a number of one or more GUI item locations corresponding to each GUI item of the plurality of GUI items.

19. The computer readable storage medium of claim 15, wherein the adding includes removing a GUI item location that was added earliest among the one or more GUI item locations in the set of one or more GUI item locations corresponding to the respective GUI item, from the set of one or more GUI item locations corresponding to the respective GUI item.

* * * * *

UNITED STATES PATENT AND TRADEMARK OFFICE
CERTIFICATE OF CORRECTION

PATENT NO.        : 7,900,156 B2
APPLICATION NO.   : 11/696703
DATED             : March 1, 2011
INVENTOR(S)       : Bartley K. Andre et al.

It is certified that error appears in the above-identified patent and that said Letters Patent is hereby corrected as shown below:

In column 1, line 12, delete "10/903,964" and insert -- 10/903,964, --, therefor.

In column 3, line 23, delete "and or" and insert -- and/or --, therefor.

In column 5, line 37, delete "dk" and insert -- dl --, therefor.

Signed and Sealed this
Eighth Day of November, 2011

David J. Kappos
*Director of the United States Patent and Trademark Office*